(12) United States Patent
Kai et al.

(10) Patent No.: US 7,540,533 B2
(45) Date of Patent: Jun. 2, 2009

(54) AIR BAG DEVICE

(75) Inventors: Takeshi Kai, Wako (JP); Daiei Tonooka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 323 days.

(21) Appl. No.: 11/460,437

(22) Filed: Jul. 27, 2006

(65) Prior Publication Data
US 2007/0024039 A1    Feb. 1, 2007

(30) Foreign Application Priority Data
Jul. 28, 2005    (JP)    ............... 2005-219251

(51) Int. Cl.
*B60R 21/30* (2006.01)
(52) U.S. Cl. ..................................... 280/739
(58) Field of Classification Search ................. 280/739, 280/743.1
See application file for complete search history.

(56) References Cited

U.S. PATENT DOCUMENTS

| | | | | |
|---|---|---|---|---|
| 4,111,458 A | * | 9/1978 | Okada et al. ................. | 280/739 |
| 5,007,662 A | * | 4/1991 | Abramczyk et al. ......... | 280/739 |
| 5,193,847 A | * | 3/1993 | Nakayama ................... | 280/738 |
| 5,249,824 A | * | 10/1993 | Swann et al. ................. | 280/729 |
| 5,501,488 A | * | 3/1996 | Saderholm et al. .......... | 280/739 |
| 5,603,526 A | * | 2/1997 | Buchanan ................... | 280/739 |
| 5,669,628 A | * | 9/1997 | Kaufmann et al. .......... | 280/739 |
| 5,704,639 A | * | 1/1998 | Cundill et al. ............... | 280/739 |
| 6,607,796 B1 | * | 8/2003 | Hirai .......................... | 428/35.2 |
| 6,722,695 B2 | * | 4/2004 | Kobayashi et al. .......... | 280/739 |

FOREIGN PATENT DOCUMENTS

| | | | |
|---|---|---|---|
| JP | 06286570 A | * | 10/1994 |
| JP | 10-71923 | | 3/1998 |
| JP | 2000-43674 | | 2/2000 |

* cited by examiner

*Primary Examiner*—John Q. Nguyen
*Assistant Examiner*—Nicole Verley
(74) *Attorney, Agent, or Firm*—Rankin, Hill & Clark LLP

(57) ABSTRACT

An air bag device of the present invention includes an bag member formed by a circular front-side cloth and a circular reverse-side cloth which are sewn together at their outer peripheral edge portions. The air bag device is provided with an annular lid member for closing a plurality of gas discharge portions formed in the reverse-side cloth. Therefore, in this air bag device, the bag member can be instantaneously inflated and expanded to effectively restrain the passenger and also to effectively absorb an impact energy acting on the passenger.

9 Claims, 4 Drawing Sheets

AIR BAG DEVICE

The application claims foreign priority under 35 USC 119 from Japanese patent application JP 2005-219251, the disclosure of which is herein incorporated by reference.

BACKGROUND OF THE INVENTION

1. Technical Field

This invention relates to an air bag device for protecting a passenger from an impact developing at the time of a frontal collision of a vehicle, and more particularly to an air bag device in which an bag member can be instantaneously inflated and expanded to effectively restrain the passenger and also to effectively absorb an impact energy acting on the passenger.

2. Background Art

There are known conventional air bag devices that reduce the impact acting on the passenger during a frontal collision by supplementing an effect of a seat belt, if the impact exceeds a predetermined value. In such an air bag device, an bag member is inflated and expanded by high-pressure gas, and the passenger is protected by a cushioning effect of the inflated and expanded bag member. This air bag device is mounted in a central portion of a steering wheel or in an instrument panel. Usually, the bag member used in the air bag device is formed by superposing a reverse-side cloth of a circular shape (on which an inflator for generating gas at the time of a frontal collision is mounted) and a front-side cloth of a circular shape (which abuts against the passenger upon inflation and expansion of the air bag) together, and then sewing peripheral edge portions of the two cloths together.

In the conventional bag member, a plurality of openings (vent holes) are formed in the reverse-side cloth. At the time of a frontal collision of the vehicle, gas generated from the inflator is fed into the interior of the bag member. However, when the pressure within the bag member excessively increases, there is a risk that the passenger strikes against the bag member and rebounds greatly, which is dangerous. Therefore, excess gas is discharged from the interior of the bag member through the vent holes in order to prevent the pressure within the bag member from excessively increasing.

However, the bag member is of the structure in which the openings are merely formed in the reverse-side cloth, and therefore gas is discharged even in the process of inflating and expanding the bag member. Therefore, a large inflator output is required for instantaneously inflating and expanding the bag member. It is also difficult to properly control the pressure within the bag member since the bag member has the structure in which the openings are merely provided.

On the other hand, there is disclosed an air bag device in which a cover is provided to cover a vent hole from the inside in order to properly control a pressure within an bag member (see JP-A-10-71923). In this air bag device, when the pressure within the bag member is low, the vent hole is covered with the cover. When the pressure within the bag member increases, the cover ejects outwardly from the air bag through the vent hole, so that the vent hole is opened. Therefore, the bag member is quickly inflated and expanded at the time of a frontal collision of a vehicle, and the pressure within the bag member can be properly controlled. Therefore the air bag device can effectively restrain the passenger, and can effectively absorb an impact energy.

There is also disclosed an air bag device comprising a first sheet member mounted at the inflator side, a second sheet member disposed at the passenger side, and a third sheet member interconnecting the first and second sheet members. A superposition portion is formed between the first sheet member and the third sheet member, and a gap portion for discharging gas is formed in this superposition portion (See JP-A-2000-43674). In this air bag device, when the pressure of gas generated from an inflator is low, a closed condition is maintained by the superposition portion, a wasteful discharge of the gas will not occur. On the other hand, when the pressure of the gas increases, the superposition portion is moved apart from an bag member by the pressure of the gas, so that the gas is discharged through the gap portion formed in the superposition portion. Therefore, the amount of discharge of the gas as well as the direction of discharge of the gas can be controlled, and the pressure within the bag member can be reduced.

SUMMARY OF THE INVENTION

This invention has been made in view of the foregoing, and an object of the invention is to provide an air bag device in which as compared with the conventional devices, an bag member can be instantaneously inflated and expanded to effectively restrain the passenger and also to effectively absorb an impact energy acting on the passenger.

The above object has been achieved by the present invention having the following features.

According to a first aspect of the present invention, there is provided an air bag device comprising: a bag member comprising: a substantially circular front-side cloth; and a substantially circular reverse-side cloth, of which an outer peripheral edge is sewn to the front-side cloth; and an inflator that feeds gas into the bag member to inflate and expand the bag member, wherein the reverse-side cloth of the bag member comprises: a gas inlet port that is connected to the inflator; a plurality of gas discharge ports disposed on the reverse-side cloth so as to surround the gas inlet port; and an annular lid member that closes the plurality of gas discharge ports.

The air bag device of the first aspect is characterized in that it is provided with the annular lid member for closing the gas discharge ports formed in the reverse-side cloth of the bag member. This annular lid member closes the gas discharge ports when the pressure within the bag member is low. However, when this pressure increases, the lid member opens the gas discharge ports so as to discharge excess gas. Namely, during inflation and expansion of the bag member, the discharge of the gas is prevented, and therefore the gas generated from the inflator can be used for inflating and expanding the bag member without being wasted. Therefore, the bag member can be instantaneously inflated and expanded, and the intended airbag surface can be quickly formed. Therefore, a reduced output of the inflator and a compact design of the inflator can be expected.

On the other hand, when the bag member is inflated and expanded so that its internal pressure increases, the annular lid member is opened by this internal pressure. The gas discharge ports are thereby opened and excess gas is discharged through these gas discharge ports. Therefore, the internal pressure of the bag member can be controlled to a predetermined level, and the internal pressure of the bag member will not be excessively increased. As a result, the passenger is effectively restrained by the inflated and expanded bag member. Namely, in the air bag device of the first aspect, as compared with the conventional devices, the bag member can be instantaneously inflated and expanded to effectively restrain the passenger and also to effectively absorb an impact energy acting on the passenger.

According to a second aspect of the present invention, the annular lid member is formed of a cloth, wherein an outer peripheral edge portion of the annular lid member is sewn to the reverse-side cloth.

In the air bag device according to the second aspect, the annular lid member is formed of the cloth, and is sewn at its outer peripheral edge portion to the reverse-side cloth. With this construction, during inflation and expansion of the bag member, the gas discharge ports are kept closed by the annular lid member (which is sewn only at its outer peripheral edge portion to the reverse-side cloth) since the lid member is held in intimate contact with the reverse-side cloth. Since the inner peripheral edge portion of the annular lid member (which is made of the cloth) is free, when the bag member is sufficiently inflated and expanded, its internal pressure increases, and the lid member is bent or curved outwardly about the outer peripheral edge portion thereof. As a result, the gas discharge ports are opened and excess gas is discharged through these gas discharge ports. This lid member is made of the cloth and has flexibility, and therefore can be bent with good sensibility in response to a change in the internal pressure of the bag member. Therefore, in this air bag device, the internal pressure of the bag member can be more properly controlled than in the air bag device of the first aspect.

Usually, an bag member is incorporated in a folded state in an air bag device. In this respect, the lid member of the air bag device of the second aspect is made of the cloth, and therefore it is easy to fold the bag member. Therefore, a compact design of the air bag device can also be achieved.

In the air bag device of the second aspect, the lid member made of the cloth is sewn at its outer peripheral edge portion to the reverse-side cloth, whereas in the air bag device of the third aspect of the present invention, only part of the outer peripheral edge portion of the lid member is sewn to the reverse-side cloth. Namely, not only the inner peripheral edge portion of the annular lid member but also part of the outer peripheral edge portion thereof are free. With this construction, when the pressure within the bag member increases, gas is discharged not only through the inner peripheral edge portion of the lid member but also through the outer peripheral edge portion that is not sewn. Therefore, the internal pressure of the bag member can be quickly reduced, and the pressure within the bag member can be controlled.

In one example of the air bag device of the third aspect, the lid member 16 is formed into a substantially square annular shape, and apex portions (that is, four corner portions) of its outer peripheral edge portion are not sewn to the reverse-side cloth, and are therefore free. In this case, gas is discharged not only through the inner peripheral edge portion of the lid member but also through the apex portions (which are not sewn), so that the internal pressure of the bag member can be quickly reduced. By thus changing the sewn portions of the outer peripheral edge portion of the lid member in various ways, the amount of discharge of the gas can be optimized.

According to a fourth aspect of the invention, it may be adaptable that the lid member is substantially circular annular shape.

According to a fifth aspect of the invention, it may be adaptable that the lid member is substantially square annular shape.

According to a sixth aspect of the invention, it may be adaptable that the substantially square annular shaped lid member is adapted to be curved inwardly or concavely.

In the present invention, there can be provided the air bag device in which the bag member can be instantaneously inflated and expanded to effectively restrain the passenger and also to effectively relieve an impact energy acting on the passenger. And besides, the inflation and expansion can be quickened, and therefore the output of the inflator can be reduced while maintaining an initial restraint force at the time of a collision. Therefore, a lightweight design of the inflator can also be expected.

DETAILED DESCRIPTION OF THE PREFERRED EMBODIMENTS

Embodiments of the present invention will now be described with reference to the drawings. In the description of the second and third embodiments, explanation of those portions that are similar in construction to those of the first embodiment will be omitted or simplified.

First Embodiment

Figure 1:
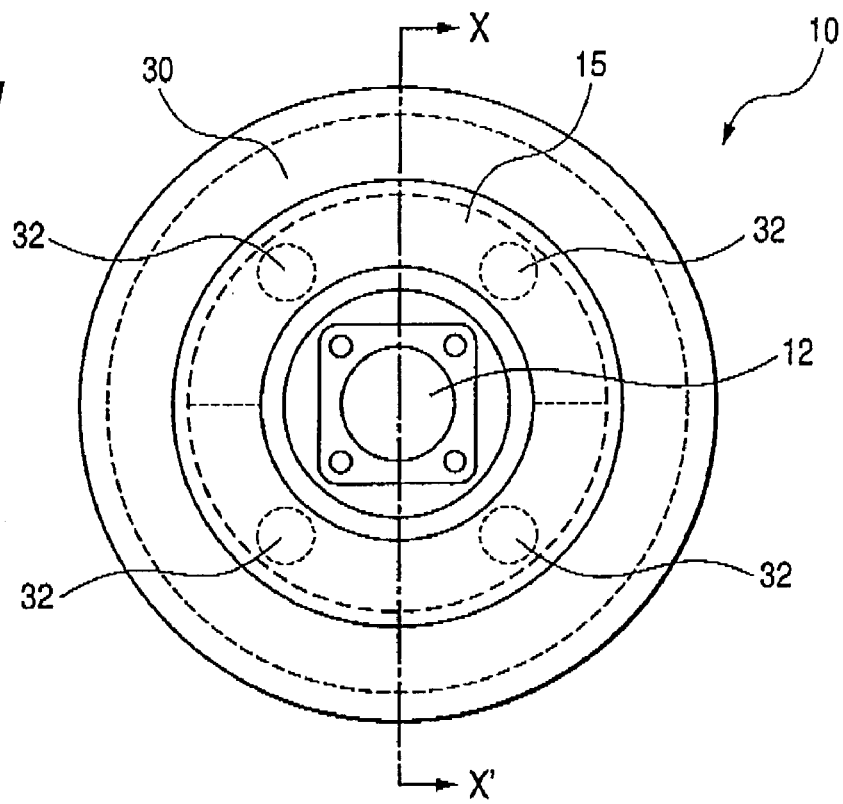
FIG. 1 is a rear view of a first embodiment of an air bag device of the present invention.
Figure 2:
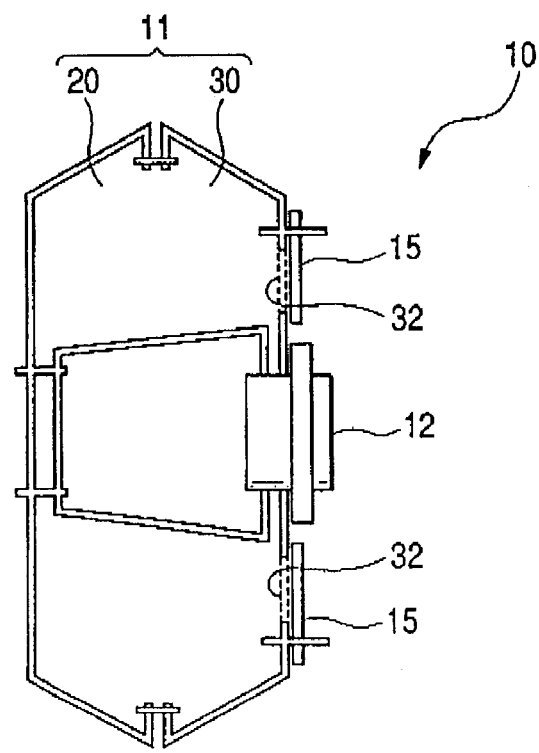
FIG. 2 is a schematic cross-sectional view of the air bag device taken along the line X-X' of FIG. 1.

FIG. 1 is a rear view of an air bag device 10 of this embodiment. FIG. 2 is a schematic cross-sectional view of the air bag device 10 taken along the line X-X' of FIG. 1. The air bag device 10 is mounted on a steering wheel body (not shown) mounted on a distal end of a steering shaft (not shown) suitably adjustably tilted. The air bag device 10 is supported by a base plate (not shown) made of metal or other material, and a cover member (not shown) made of a synthetic resin is attached to this base plate. In this air bag device 10, an bag member 11 is inflated by gas generated by an inflator 12 at the time of a frontal collision of a vehicle to break the cover member, and is expanded from a central portion of the steering wheel body toward a passenger compartment, thereby restraining the passenger so as to protect the passenger from an impact of a secondary collision.

The air bag device 10 mainly comprises the bag member 11 and the inflator 12 for generating gas at the time of a frontal collision of the vehicle and then for feeding this gas into the bag member 11 to inflate and expand it. The inflator 12 is provided in an opening formed in a central portion of the air bag device 10, and comprises an explosive for producing gas, and an electrically-operated ignition device for burning this explosive so as to generate the gas. The bag member 11 held in a folded condition is mounted gastight around the outer periphery of the inflator 12. The air bag device 10 further includes a sensor for detecting an impact developing at the time of a frontal collision of the vehicle and for outputting an ignition signal to the ignition device of the inflator 12.

A feature of the air bag device 10 of this embodiment resides in the bag member 11. The bag member 11 of this embodiment is formed by a flexible cloth having a coating formed thereon for preventing the permeation of gas. More specifically, the bag member 11 comprises a front-side cloth 20 of a generally circular shape, and a reverse-side cloth 30 of a generally circular shape which is sewn at its outer peripheral edge portion to the front-side cloth 20, the inflator 12 being connected to the reverse-side cloth 30. The front-side cloth 20 can be provided with a plurality of straps for regulating the expanded shape. Four gas discharge ports 32 for discharging excess gas when the bag member 11 is inflated and expanded are formed in the reverse-side cloth 30, and arranged around a gas inlet port formed in the reverse-side cloth 30.

The reverse-side cloth 30, forming the bag member 11 of this embodiment, is provided with a lid member 15 of a circular annular shape which closes the gas discharge ports 32. This lid member 15 is sewn at its outer peripheral edge portion to the reverse-side cloth 30, while its inner peripheral edge portion is not sewn to the reverse-side cloth 30, and therefore is free. In the air bag device 10 of this embodiment, the lid member 15 is formed of a cloth similar to the front-side cloth 20 and the reverse-side cloth 30. The lid member 15 can also be made of a cloth different in kind from the front-side cloth 20 and the reverse-side cloth 30.

Figure 3:
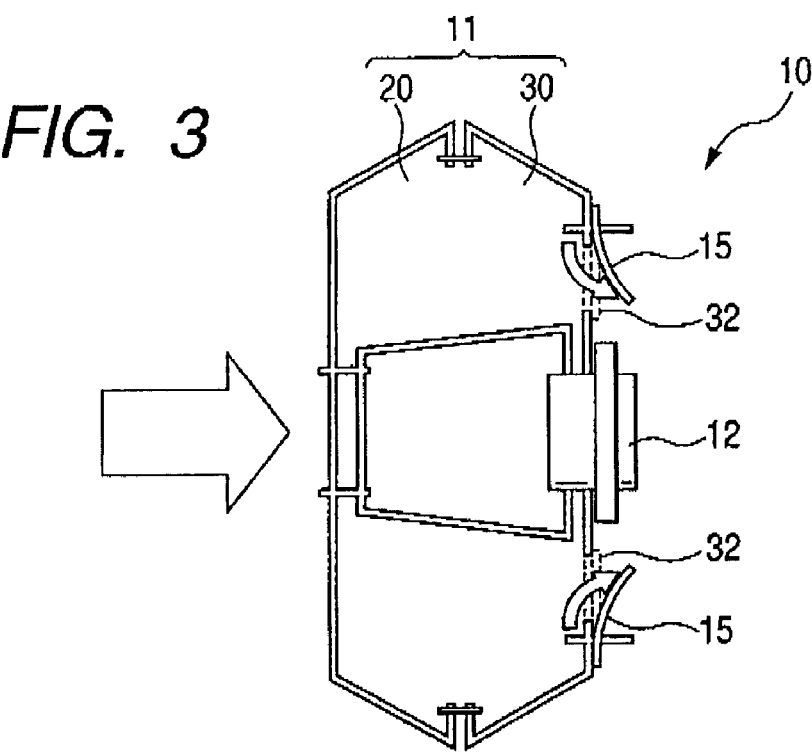
FIG. 3 is a view for explaining an operation of the air bag device of the first embodiment.
Figure 4:
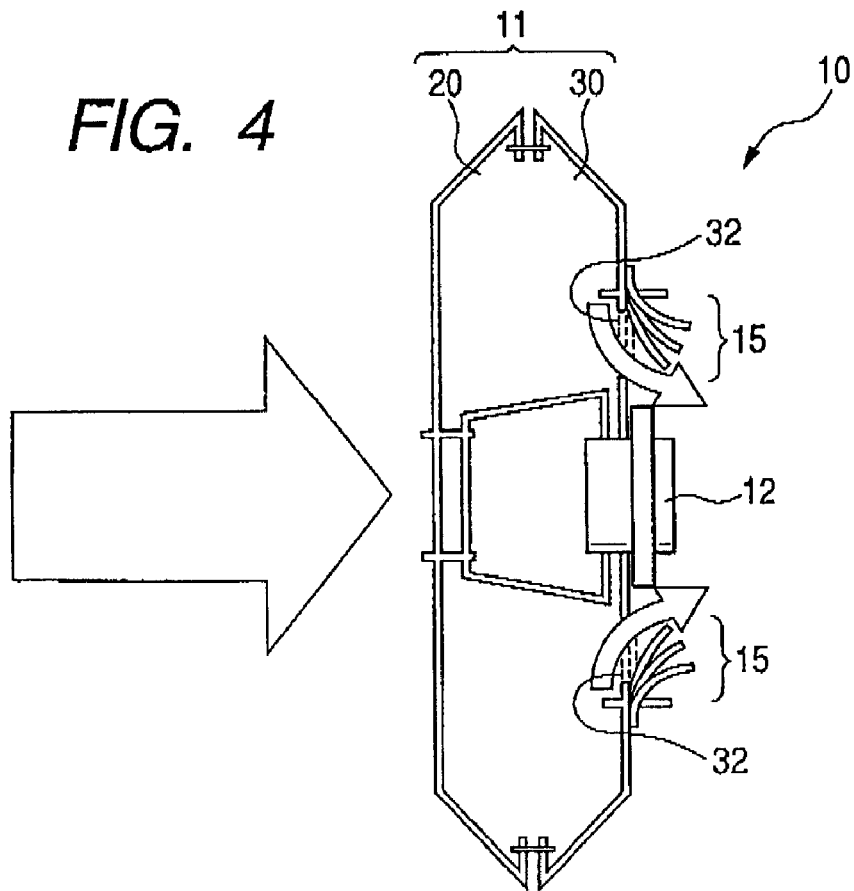
FIG. 4 is a view for explaining the operation of the air bag device of the first embodiment.

The operation of the air bag device 10 of the first embodiment will be described. First, when the sensor detects an impact produced in the event of a frontal collision of the vehicle, this sensor outputs an ignition signal to the inflator 12. The ignition device of the inflator 12 is activated in response to the outputted ignition signal to burn the explosive, so that the explosive produces high-pressure combustion gas. The thus produced gas is fed into the interior of the bag member 11, so that the bag member 11 is instantaneously inflated and expanded. In the inflation and expansion of the bag member 11, first, the gas discharge ports 32 are kept closed by the lid member 15 (which is sewn only at its outer peripheral edge portion to the reverse-side cloth 30), since this lid member 15 is held in intimate contact with the reverse-side cloth 30. Therefore, the bag member 11 is instantaneously inflated and expanded in such a manner that the gas is not discharged therefrom (see FIG. 2). Then, when the bag member 11 is sufficiently inflated and expanded and therefore is filled with the gas so that its internal pressure increases, the inner peripheral portion of the flexible lid member 15 made of the cloth is bent or curved outwardly to open the gas discharge ports 32, so that excess gas is discharged through the opened gas discharge ports 32 (see FIG. 3). Then, when the passenger contacts the bag member 11 and is subjected to an impact energy, the lid member 15 is further bent outwardly to allow a larger amount of gas to be discharged, thereby efficiently absorbing the energy produced at the time of the collision (see FIG. 4).

Second Embodiment

Figure 5:
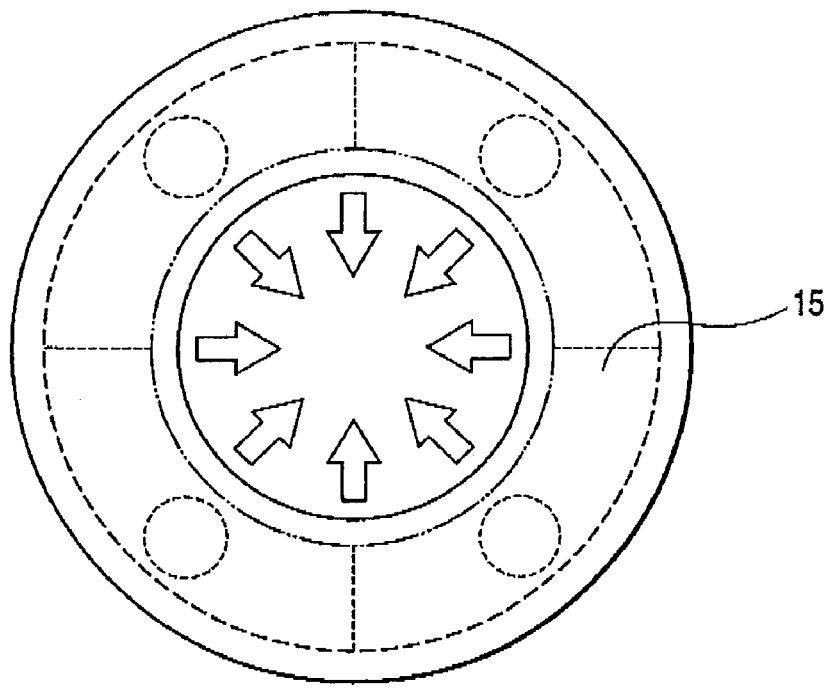
FIG. 5 is a plan view of a lid member of the air bag device of the first embodiment.
Figure 6:
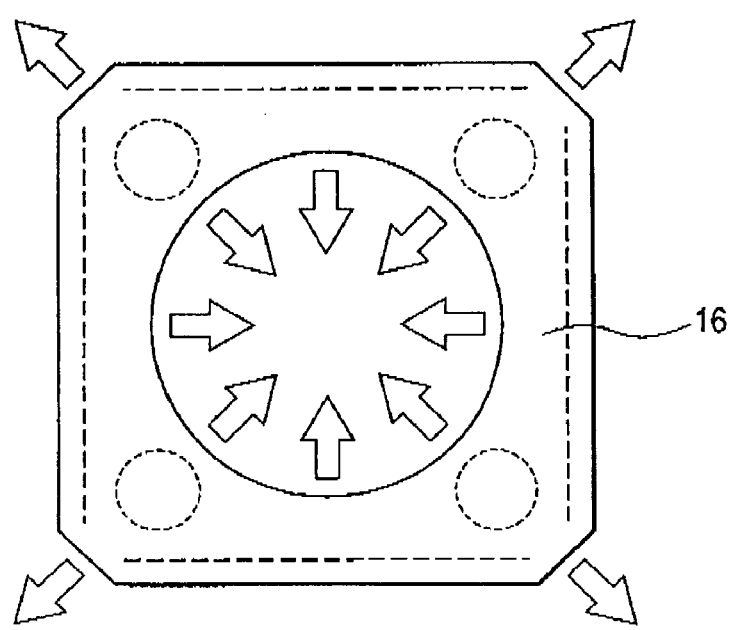
FIG. 6 is a plan view of a lid member of an air bag device of a second embodiment.

An air bag device of the second embodiment is similar in construction to the air bag device of the first embodiment except that a lid member has a different shape and different sewn portions. FIGS. 5 and 6 are plan views respectively showing the lid member 15 of the air bag device of the first embodiment and the lid member 16 of the air bag device of the second embodiment. As shown in these figures, the lid member 15 has the circular annular shape, while the lid member 16 has a substantially square annular shape, and is sewn to a reverse-side cloth at its outer peripheral edge portion except apex portions (that is, four corner portions) thereof.

The operation of the air bag device of the second embodiment is basically similar to the operation of the air bag device 10 of the first embodiment. The only difference is that gas is discharged not only through an inner peripheral edge portion of the lid member 16 but also through the apex portions thereof at the time of inflation and expansion of the air bag member, since the apex portions of the lid member 16 are not sewn to the reverse-side cloth. Therefore, the internal pressure of this bag member can be more properly controlled.

Third Embodiment

Figure 7:
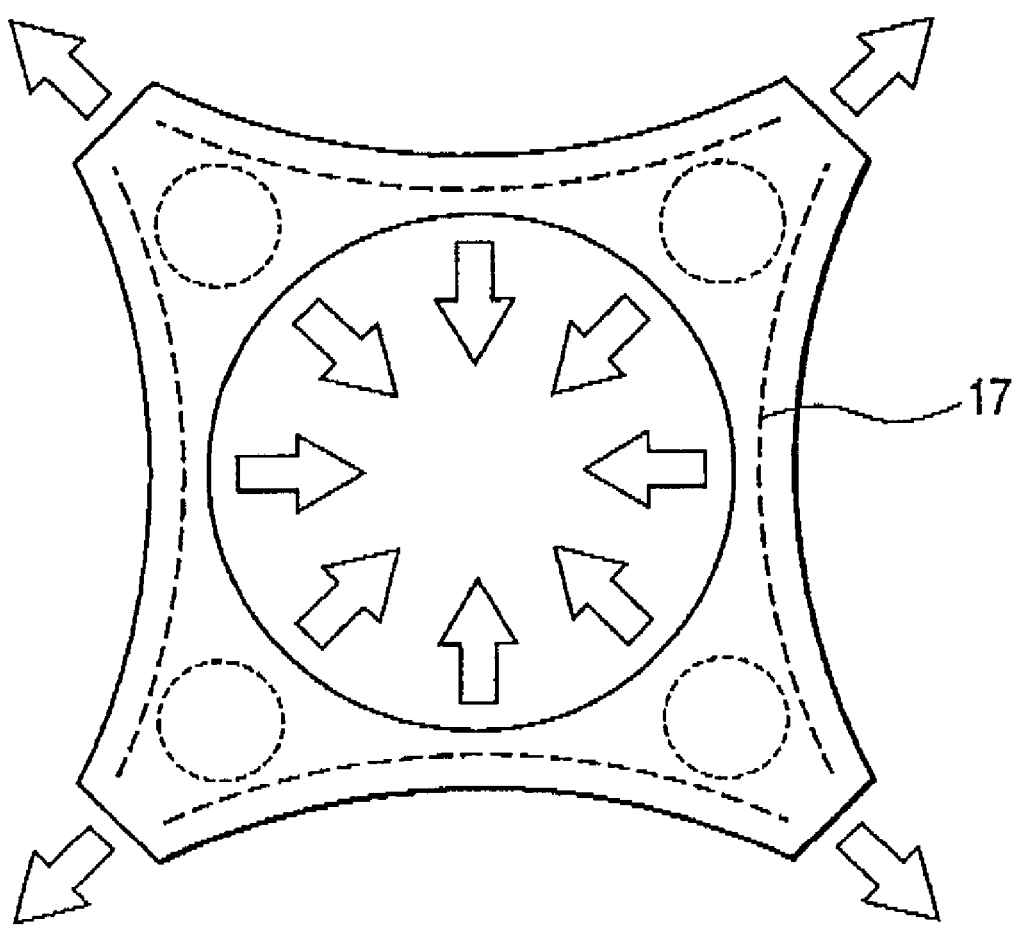
FIG. 7 is a plan view of a lid member of an air bag device of a third embodiment.

An air bag device of the third embodiment is similar in construction to the air bag device of the second embodiment except that four sides of a lid member of a substantially square annular shape are curved inwardly or concavely. FIG. 7 is a plan view showing the lid member 17 of the air bag device of the third embodiment. As shown in FIG. 7, the lid member 17 is sewn to a reverse-side cloth at its outer peripheral edge portion except apex portions (that is, four corner portions) thereof.

The operation of the air bag device of the third embodiment is similar to the operation of the air bag device of the second embodiment. Namely, the third embodiment is similar to the second embodiment in that gas is discharged not only through an inner peripheral edge portion of the lid member 17 but also through the apex portions thereof at the time of inflation and expansion of the air bag member, since the apex portions of the lid member 17 are not sewn to the reverse-side cloth. The only difference is that the lid member 17 is formed into such a shape as to allow the gas to be discharged more easily through gas discharge ports. Therefore, the internal pressure of the bag member can be more properly controlled.

The air bag devices of the above embodiments are not limited to the type in which the bag member is inflated and expanded from the steering wheel into the passenger compartment, thereby restraining the driver on the driver's seat. The present invention can also be of the type in which an air bag is inflated and expanded from an instrument panel into the passenger compartment, thereby restraining the passenger on the passenger seat. Furthermore, in the air bag devices of the above embodiments, the inflator is not limited to the type utilizing combustion gas produced by the explosive, but can be of the type using high-pressure gas filled in a gas container.

What is claimed is:

1. An air bag device, comprising:
  a bag member comprising:
    a front-side cloth; and
    a reverse-side cloth, of which an outer peripheral edge is sewn to the front-side cloth; and
  an inflator that feeds gas into the bag member to inflate and expand the bag member,
  wherein the reverse-side cloth of the bag member comprises:
    a gas inlet port that is connected to the inflator;
    a plurality of gas discharge ports disposed on the reverse-side cloth so as to surround the gas inlet port; and
  an annular lid member that closes the plurality of gas discharge ports, wherein the annular lid member has an inner edge and an outer edge, said outer edge being attached to the reverse-side cloth at a location between the gas discharge ports and the outer peripheral edge of the reverse-side cloth, said inner edge being freely movable relative to said reverse-side cloth so as to permit said annular lid member to move away from the reverse-side cloth and thereby expose said gas discharging ports.

2. The air bag device according to claim 1, wherein the annular lid member is formed of a cloth, and
  an outer peripheral edge portion of the annular lid member is sewn to the reverse-side cloth.

3. The air bag device according to claim 1, wherein the lid member is substantially circular annular shape.

4. An air bag device, comprising:
a front-side cloth;
a reverse-side cloth having an inner surface facing toward the front-side cloth and an outer surface facing away from the front side cloth, said reverse-side cloth having an outer peripheral edge that is connected to the front-side cloth, wherein the reverse-side cloth defines an opening for receipt of an inflator and a plurality of discharge ports, said discharge ports being disposed between the opening and the outer peripheral edge; and
an annular lid with an inner edge that allows for passage of the inflator and an outer edge that is connected to the reverse-side cloth at a location between the gas discharge ports and the outer peripheral edge of the reverse-side cloth, wherein the annular lid is secured to the outer surface of the reverse-side cloth.

5. The air bag device according to claim 4, wherein the annular lid is formed of a cloth, and
the outer diameter of the annular lid is sewn to the reverse-side cloth.

6. The air bag device according to claim 4, wherein the annular lid is substantially circular annular shape.

7. The air bag device according to claim 1, wherein the annular lid member is formed of a cloth, and
a part of an outer peripheral edge portion of the annular lid member is sewn to the reverse-side cloth.

8. The air bag device according to claim 1, wherein the lid member is substantially square annular shape.

9. The air bag device according to claim 8, wherein the substantially square annular shaped lid member is adapted to be curved inwardly or concavely.

* * * * *